INVENTORS.
SALVATORE J. COMADO
LAWRENCE R. SPARROW
JERRY BRAIMAN

BY *Robert Gennie*

ATTORNEY

United States Patent Office 3,343,047
Patented Sept. 19, 1967

3,343,047
HERMETICALLY SEALED SOLID
TANTALUM CAPACITOR
Salvatore J. Comado, Lawrence R. Sparrow, and Jerry Braiman, all of Indianapolis, Ind., assignors to P. R. Mallory & Co., Inc., Indianapolis, Ind., a corporation of Delaware
Filed Oct. 5, 1964, Ser. No. 401,547
8 Claims. (Cl. 317—230)

ABSTRACT OF THE DISCLOSURE

An hermetically sealed electrical device including a ceramic bead and hermetically impervious metal layer having a thickness of about 3 to 10 mils cooperatively associated so as to provide an hermetic enclosure for the electrical device.

The present invention relates to electrolytic devices and more particularly relates to means for providing hermetic seals for solid tantalum capacitors in a plating operation which also provides the cathode material and the packaging means.

Hermetic seals for solid tantalum capacitors are usually obtained by applying a metal cathodic coating to a tantalum anode after the anode has been formed and electrolyte impregnated. The anode is then placed into a metal can which has a solder pellet therein, a solder pellet and hermetic seal placed over the open end of the can, and heating said unit to melt the solder, thus insuring good mechanical and electrical connection and a hermetic seal. The major disadvantage of the present method is that it necessitates a number of handling operations on a product which should receive a minimum amount of handling. A further disadvantage is the number of unnecessary parts involved, such as the cathode can, solder pellets and a glass-to-metal seal. The present methods further require the handling of individual units for a number of operations.

Therefore, it is an object of the present invention to provide a unique, hermetically sealed solid tantalum capacitor.

It is an object of the present invention to provide a hermetically sealed solid tantalum capacitor which is considerably smaller in volume than the conventional hermetically sealed solid tantalum capacitors.

It is an object of the present invention to provide a means for hermetically sealing solid tantalum capacitors which dispenses with the metal can, solder connections and the convention glass-to-metal seal.

It is an object of the present invention to reduce the number of handling operations in the production of hermetically sealed solid tantalum capacitors.

It is an object of the present invention to provide a means of producing a hermetically sealed capacitor wherein a number of capacitors are processed at one time.

The present invention in another of its aspects, relates to the novel features of the instrumentalities of the present invention described therein for teaching the principal object of the present invention and to the novel principles employed in the instrumentalities whether or not these features and principles may be used in the said object or in the said field.

With the aforesaid objects enumerated, other objects will be apparent to those possessing ordinary skill in the art; other objects will appear in the following description, appended claims and appended drawings. The invention resides in the novel construction, combination, arrangement, and cooperation of the elements as hereinafter described and more particularly as defined in the appended claims.

For a fuller understanding of the nature and objects of the invention, reference has been made to the following detailed description taken in conjunction with the accompanying drawings in which.

The conventional process for producing hermetically sealed solid tantalum capacitors consists of pressing and sintering the tantalum pellet; welding the pellet to a tantalum ribbon; coating the anode riser with a protective substance such as colloidal Teflon to prevent electrolyte creepage therealong; forming the pellet; impregnating the pellet with a compound such as manganese nitrate which is capable of pyrolytic conversion to an electrically conductive oxide, applying a protective layer, such as graphite; applying a cathode material to the anode; cutting the anode from the ribbon; welding an anode lead to the anode riser; drying the anode; placing a solder pellet into a metal can; placing the anode into the can so that the bottom portion of the anode contacts the solder pellet; fitting a solder pellet and a glass-to-metal seal over the anode lead so that they contact the top portion of the can; heating the unit to melt the solder to provide electrical and mechanical connection; and finally sealing around the anode lead opening and affixing a cathode lead.

Generally speaking, the steps of the present invention consists of pressing a tantalum pellet with an anode riser having a glass or ceramic bead thereon and adjacent the top portion of the capacitor. Conventional steps with the exception of coating the anode riser with Teflon, are then followed through the graphite application. However, instead of cutting the anodes from the ribbon and applying a metal cathode by spraying, the anodes (still on the strips) are placed in plating racks and a cathode layer which also serves as the final packaging means are plated thereon.

Figure 1:
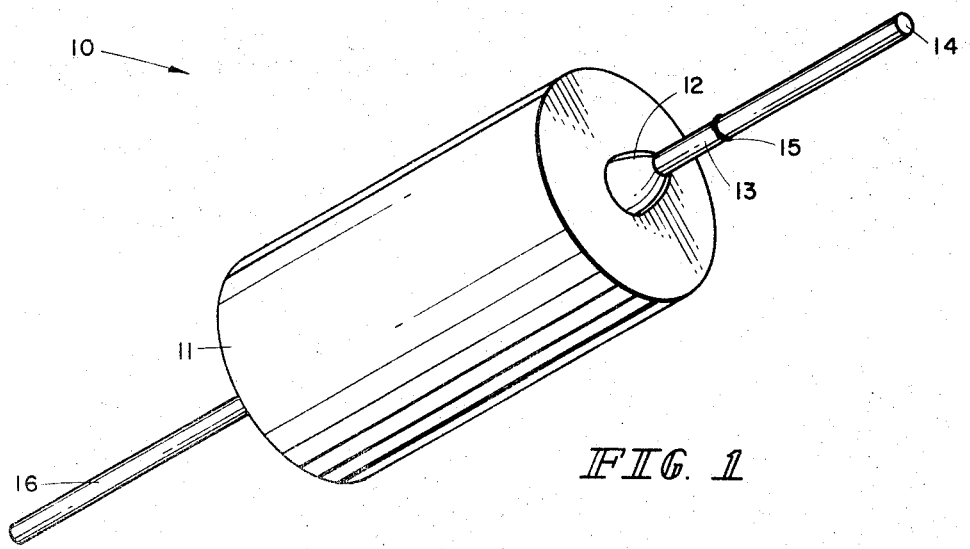
FIGURE 1 is an isometric view of the capacitor body prior to plating the cathode and packaging means.

In FIGURE 1, anode 11 having anode riser 13 extending therefrom is shown. Ceramic bead 12, which is sintered to anode riser 13 and anode 11 replaces the need for a conventional glass-to-metal seal and eliminates the time-consuming process of coating the anode lead with an aqueous dispersion of Teflon and fusing said coating prior to electrolyte impregnation to prevent electrolyte creepage on the anode riser 13. Although anode lead 14 is not affixed until the unit has been plated, it is shown in FIGURE 1, as is cathode lead 16, to show the relationship of the parts. Anode 11 is placed in a plating rack (not shown) which provides a masking means for the upper portion of bead 12 and that portion of anode riser 13 not surrounded by bead 12. The heating prior to plating eliminates the step of drying the capacitor to final sealing. The capacitor body is heated to 180°–200° C. A gaseous stream comprising a carrier gas, such as argon and a minimum of 4% nickel carbonyl vapor, is passed through the chamber until a nickel coating of sufficient mechanical and electrical strength is obtained. It has been found that a coating of 3–10 mils is sufficient, although different capacitor applications may necessitate varying thicknesses.

Figure 2:
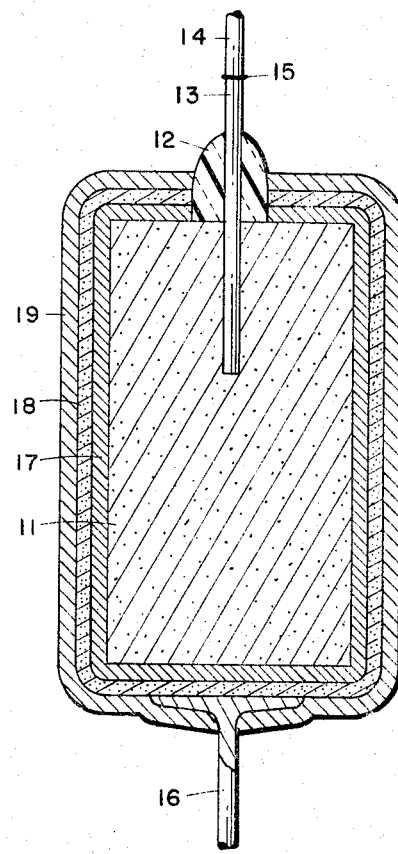
FIGURE 2 is a section view of the novel, hermetically sealed solid tantalum capacitor.

FIGURE 2 is a sectional view of the plated hermetically sealed capacitor 10. Anode 11 has a dielectric film formed thereon (not shown), a manganese dioxide electrolyte 17 pyrolytically produced in the pores of said pellet in contact with said dielectric film and also forming a continuous layer 17 on the outer surface of anode 11. Outer layer 17 of manganese dioxide is coated with a colloidal graphite layer 18. This may be accomplished by dipping anode 11 into a colloidal graphite suspension and drying it to drive off moisture. Metal layer 19 is then obtained by a plating process. Layer 19 serves as the cathode material, fixing means for cathode lead 16, final packaging means and forms a hermetic seal with ceramic bead 12. As can be seen from FIGURE 2, the novelty resides in the elimination of a conventional glass-to-metal seal by ceramic bead 12, plated cathode and plated packaging 19. As bead 12 is sintered to anode riser 13, thus eliminating the operation of soldering the bead-anode opening. Anode lead 14 is welded to anode riser 13 at junction 15 and a hermetically sealed solid tantalum capacitor which is much smaller in volume, more economical and simpler to produce than conventional capacitors is obtained.

Although the plating process as hereinbefore described specifies a organo-nickel compound, any metallic compound capable of vaporization, decomposition and deposition at temperatures which will not harm the substrate and which will provide a moisture impervious coating of sufficient mechanical strength may be used. Such compounds include nickel tetracarbonyl, iron pentacarbonyl, and any other suitable organo-metallic compound.

Furthermore, the present invention is not limited to vapor-phase deposited coating. Any plating method which provides a moisture impervious coating of sufficient mechanical strength and which does not damage the capacitor may be used. Such methods include vacuum plating, electroplating, electroless plating, etc.

The present invention is also applicable to capacitors wherein a cathodic material such as conductive plastics, sprayed and dipped metals and the like are applied to the anode by conventional means. Coatings are then deposited on the conductive plastic or metal substrates for obtaining hermetic seals. In this case, the coating serves as the container and as a sealing means. This is particularly applicable to situations wherein it is desirable to retain conventional cathodic material but produce a unit of smaller volume than can be obtained by the conventional method.

It will be understood that this invention is susceptible to modification in order to adapt it to different usages and conditions. Such modifications in the specific embodiments above will be readily apparrent to these skilled in the art. I consider all of these variations and modifications to be within the foregoing description and defined by the appended claims. Having thus described our invention:

We claim:

1. An hermetically sealed electrical device comprising a porous anode of film-forming metal characterized by a multiplicity of intercommunicating voids having a terminal riser, a dielectric film initimately covering the surface of said anode and said pores, an immobilized electrolyte layer overlying said dielectric layer, a seal means coupled to said anode and to said terminal riser hermetically sealing the joint between said anode and said terminal riser, and an hermetically impervious metal layer disposed on said immobilized electrolyte layer forming the cathode of and encasing the device, and having a margin embracing the periphery of said seal means in an hermetically sealed joint.

2. An hermetically sealed electrical device comprising a porous anode of film-forming metal characterized by a multiplicity of intercommunicating voids having a terminal riser, a dielectric film intimately covering the surface of said anode and said pores, an immobilized electrolyte layer overlyin gthe dielectric layer, a graphite layer overlying said immobilized electrolyte layer, a seal means coupled to said anode and to said terminal riser hermetically sealing the joint between said anode and said terminal riser, and an hermetically impervious metal layer disposed on said graphite layer forming the cathode of and encasing the device and having a margin embracing the periphery of said seal means in an hermetically sealed joint.

3. An hermetically sealed electrical device comprising a porous anode of tantalum characterized by a multiplicity of intercommunicating voids having a terminal riser, a dielectric film intimately covering the surface of said anode and said pores, an immobilized electrolyte layer overlying the dielectric layer, a graphite layer overlying said immobilized electrolyte layer, a seal means coupled to said anode and to said terminal riser hermetically sealing the joint between said anode and said terminal riser, and an hermetically impervious metal layer having a thickness of about 3 to 10 mils disposed on said graphite layer forming the cathode of and encasing the device and having a margin embracing the periphery of said seal means in an hermetically sealed joint.

4. An hermetically sealed electrical device comprising a porous anode of tantalum characterized by a multiplicity of intercommunicating voids having a terminal riser, a dielectric film intimately covering the surface of said anode and said pores, an immobilized electrolyte layer overlying the dielectric layer, a graphite layer overlying said immobilized electrolyte layer, a seal means comprising a ceramic bead sintered to said anode and to said terminal riser hermetically sealing the joint between said anode and said terminal riser, and an hermetically impervious metal layer having a thickness of about 3 to 10 mils disposed on said graphite layer forming the cathode of and encasing the device and having a margin embracing the periphery of said seal means in an hermetically sealed joint.

5. An hermetically sealed electrical device comprising a porous anode of tantalum characterized by a multiplicity of intercommunicating voids having a terminal riser, a dielectric film intimately covering the surface of said anode and said pores, an immobilized electrolyte layer overlying the dielectric layer, a graphite layer overlying said immobilized electrolyte layer, a seal means comprising a ceramic bead sintered to said anode and to said terminal riser hermetically sealing the joint between said anode and said terminal riser, cathode lead, and an hermetically impervious metal layer having a thickness of about 3 to 10 mils disposed on said graphite layer forming the cathode of and encasing the device and having a margin embracing the periphery of said seal means and embracing said cathode lead in hermetically sealed joints.

6. An hermetically sealed electrical device comprising a porous anode of tantalum characterized by a multiplicity of intercommunicating voids having a terminal riser, a dielectric film intimately covering the surface of said anode and said pores, an immobilized electrolyte layer overlying the dielectric layer, a graphite layer overlying said immobilized electrolyte layer, a seal means comprising a ceramic bead sintered to said anode and to said terminal riser hermetically sealing the joint between said anode and said terminal riser, a cathode lead, and an hermetically impervious metal layer having a thickness of about 3 to 10 mils disposed on said graphite layer forming the cathode of and encasing the device, said metal layer selected from the group consisting of nickel and iron, and said metal layer having a margin embracing the periphery of said seal means and embracing said cathode lead in hermetically sealed joints.

7. An hermetically sealed electrical device comprising a porous anode of tantalum characterized by a multiplicity of intercommunicating voids having a terminal riser, a dielectric film intimately covering the surface of said anode and said pores, a manganese dioxide layer overlying the dielectric layer, a graphite layer overlying said manganese dioxide layer, a seal means comprising a ceramic bead sintered to said anode and to said terminal riser hermetically sealing the joint between said anode and said terminal riser, an axial cathode lead, and an hermetically impervious metal layer having a thickness of about 3 to 10 mils disposed on said graphite layer forming the cathode of and encasing the device, said metal layer selected from the group consisting of nickel and iron, and said metal layer having a margin embracing the periphery of said seal means and embracing said axial cathode lead in hermetically sealed joints.

8. An hermetically sealed electrical device comprising a porous anode of tantalum characterized by a multiplicity of intercommunicating voids having a terminal riser, a seal means comprising a ceramic bead sintered to said anode and to said terminal riser hermetically sealing the joint between said anode and said terminal riser, a dielectric film intimately covering the surface of said anode and said pores, a manganese dioxide layer overlying the dielectric layer and abutting the periphery of said ceramic bead, a graphite layer overlying the manganese dioxide layer, and abutting the periphery of said ceramic bead, an axial cathode lead, and an hermetically impervious metal layer having a thickness of about 3 to 10 mils disposed on said graphite layer forming the cathode of and encasing the device, said metal layer selected from the group consisting of nickel and iron, and said metal layer having a margin embracing the periphery of said seal means and embracing said axial cathode lead in hermetically sealed joints.

References Cited
UNITED STATES PATENTS

| | | | |
|---|---|---|---|
| 3,054,029 | 9/1962 | Wagner et al. | 317—230 |
| 3,124,728 | 3/1964 | Ruben | 317—230 |
| 3,142,886 | 8/1964 | Bronson et al. | 317—230 |
| 3,182,235 | 5/1965 | Mohler et al. | 317—230 |
| 3,189,797 | 6/1965 | Okamoto et al. | 317—230 |

JAMES D. KALLAM, *Primary Examiner.*